United States Patent [19]

Rutledge et al.

[11] 4,425,876
[45] Jan. 17, 1984

[54] ALCOHOL DISSOCIATION AND WASTE HEAT RECOVERY PROCESS FOR AUTOMOBILES

[75] Inventors: Gerald D. Rutledge; Heeyoung Yoon, both of McMurray, Pa.

[73] Assignee: Conoco Inc., Wilmington, Del.

[21] Appl. No.: 414,984

[22] Filed: Sep. 3, 1982

[51] Int. Cl.³ .............................................. F02M 27/02
[52] U.S. Cl. .................................. 123/3; 123/DIG. 12
[58] Field of Search .................. 123/1 A, 3, DIG. 12; 48/197 R, 197 FM; 423/651-655

[56] References Cited

U.S. PATENT DOCUMENTS

| | | | |
|---|---|---|---|
| 3,828,736 | 8/1974 | Koch | 123/1 A |
| 4,021,370 | 5/1977 | Harris et al. | 48/197 R |
| 4,028,067 | 6/1977 | Gent | 48/197 R |
| 4,046,522 | 9/1977 | Chen et al. | 123/3 |
| 4,086,877 | 5/1978 | Henkel et al. | 123/3 |
| 4,091,086 | 5/1978 | Hindin et al. | 423/648 R |
| 4,366,782 | 1/1983 | Jackson et al. | 123/3 |

Primary Examiner—William A. Cuchinski, Jr.
Attorney, Agent, or Firm—Dale Lovercheck; William A. Mikesell, Jr.

[57] ABSTRACT

A method of fuel treatment and distribution for an internal combustion engine including the steps as follows:
- (a) operating an adiabatic reactor without a substantial amount of exhaust heat within an operational temperature range, the catalyst bed reactor including a partial combustion catalyst and a dissociation catalyst;
- (b) providing a substantial amount of engine exhaust heat to an endothermic reactor having an endothermic dissociation catalyst therein;
- (c) vaporizing liquid alcohol to form alcohol vapor;
- (d) mixing the alcohol vapor with air to form a partial combustion mixture;
- (e) contacting the partial combustion mixture and the partial combustion catalyst whereby a dissociation mixture is formed and heat is evolved;
- (f) contacting the dissociation mixture and the dissociation catalyst to form a hydrogen rich fuel;
- (g) contacting the hydrogen-rich fuel and the endothermic dissociation catalyst to form a fuel product whereby at least a portion of any residual undissociated alcohol in the hydrogen-rich fuel is dissociated to hydrogen and carbon monoxide using the engine waste heat provided by the exhaust gas.

3 Claims, 3 Drawing Figures

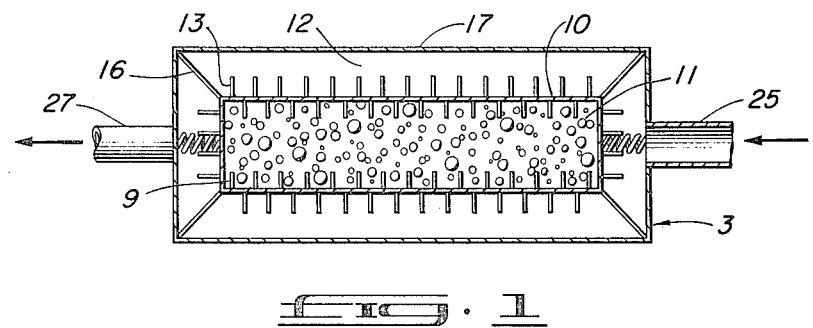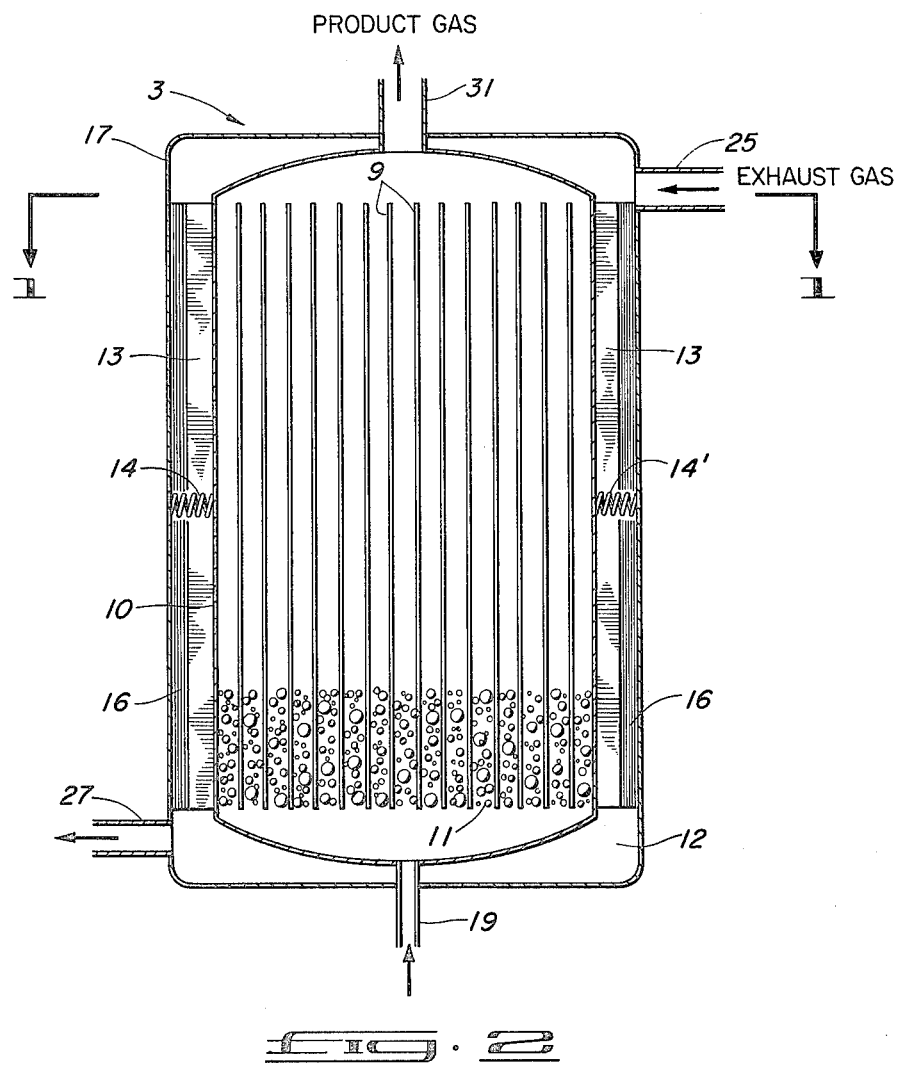

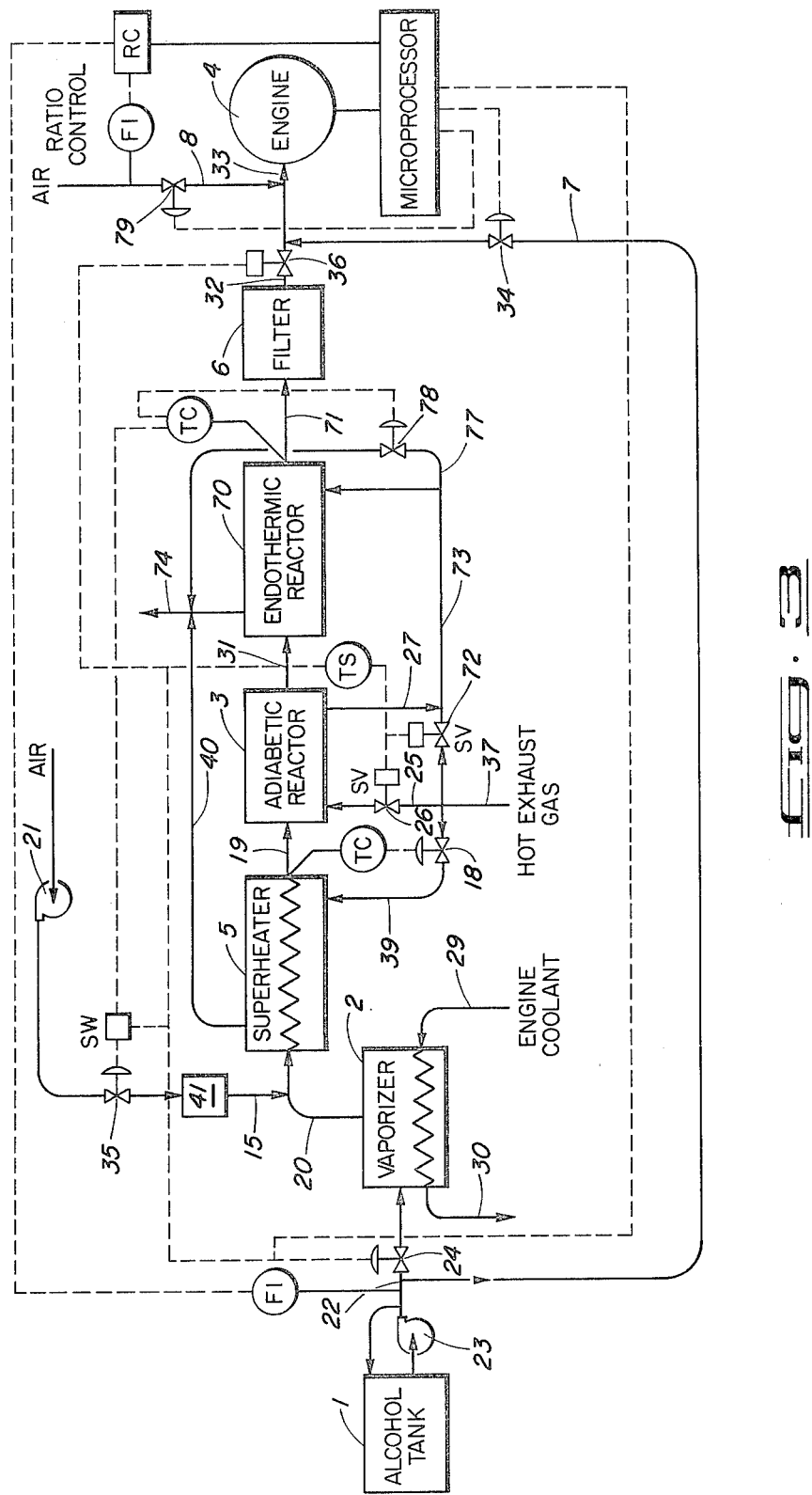

ALCOHOL DISSOCIATION AND WASTE HEAT RECOVERY PROCESS FOR AUTOMOBILES

BACKGROUND OF THE INVENTION

Kosaka et al U.S. Pat. No. 4,088,450 discloses a plurality of catalysts arranged in a desirable order based on the temperature gradient existing in the chamber for reaction. The operating temperature of the catalysts and the temperature of the portion of the reaction chamber it is in, are matched so as to avoid a catalytic degradation and/or catalytic inactivity.

Peterson et al U.S. Pat. No. 4,282,835 provides for synthesizing CO and $H_2$ fuel from methanol and water in a second synthesizer. The methanol is confined in an alcohol tank as a liquid. The water is confined in a water tank. A fuel pump and a water pump force fuel and water to a mixing valve. A heat exchanger heats the fuel and water to a gas which passes through nickel on alumina catalyst at 500° C. where the methanol dissociates to $CO+H_2$. The gas passes to a second synthesizer containing Fe on Alumina catalyst above 500° C. where water and carbon monoxide form hydrogen and carbon dioxide. The gas is then mixed with air and passes to the engine.

SUMMARY OF THE INVENTION

A method of fuel treatment and distribution for an automobile internal combustion engine comprising the steps as follows:

(a) operating an adiabatic reactor without a substantial amount of exhaust heat within an operational temperature range said catalyst bed reactor comprising a partial combustion catalyst and a dissociation catalyst;

(b) providing a substantial amount of engine exhaust heat to an endothermic reactor having an endothermic dissociation catalyst therein, (c) vaporizing liquid alcohol to form alcohol vapor;

(d) mixing said alcohol vapor with air to form a partial combustion mixture;

(e) contacting said partial combustion mixture and said partial combustion catalyst whereby a dissociation mixture is formed and heat is evolved;

(f) contacting said dissociation mixture and said dissociation catalyst to form a hydrogen-rich fuel;

(g) contacting said hydrogen-rich fuel and said endothermic dissociation catalyst to form a fuel product whereby at least a portion of any residual undissociated alcohol in said hydrogen-rich fuel is dissociated to hydrogen and carbon monoxide using the engine waste heat provided by the exhaust gas.

BRIEF DESCRIPTION OF THE DRAWINGS

FIG. 1 is a cross-sectional view of a reactor in accordance with the present invention.

FIG. 2 is a longitudinal cross-sectional view of a reactor in accordance with the present invention.

FIG. 3 is a schematic flow diagram of an automobile fuel system in accordance with the present invention.

DETAILED DESCRIPTION OF THE INVENTION

With more particular reference to the drawings, it is seen in FIG. 1 that a reaction chamber 10 is supported within the adiabatic reactor 3 by supports 16 and/or by springs 14 and 14'. The reactor chamber wall 10 encloses the catalyst bed material 11. Inner fins 9 extend from the reaction chamber wall 10 to which they are attached. The inner fins extend from the reaction chamber wall inwardly into the reaction chamber defined by the reaction chamber wall. Outer fins 13 are connected to the reaction chamber wall 10. Outer fins 13 extend outwardly from the reaction chamber wall 10 into the heat exchange chamber 12. The heat exchange chamber 12 is defined by the inner surface of the heat exchange wall 17 and the outer surface of the reaction chamber wall 10.

The ends of reaction chamber wall 10 are preferably covered by a screen or wire mesh (not shown) to retain the catalyst bed 11 therein.

As shown in FIG. 2, the heat exchange wall 17 encloses the reaction chamber wall 10. The supporting spring means 14 and 14' are connected to the inner surface of the heat exchange wall 17 and the outer surface of the reaction chamber wall 10.

As shown in FIG. 3, the adiabatic reactor 3 is connected by conduit 19 to a superheater 5. The superheater 5 receives vapor phase alcohol from the vaporizer 2 through line 20. Air is pumped through line 15 from compressor 21 into line 20. The mixture of air and methanol vapor passes through line 20 to the superheater 5. Alcohol from the alcohol tank 1 is pumped through line 22 by pump 23 to the vaporizer 2. Valve 24 in line 22 is provided to limit the flow of liquid alcohol to the vaporizer 2 from the alcohol tank 1. The mixture of air and alcohol vapor passes through line 19 into the adiabatic reactor 3. The adiabatic reactor 3 is heated by exhaust gas from the engine 4. The exhaust gas passes through line 25 to the adiabatic reactor 3. The line 25 has valve 26 therein to limit the flow of exhaust gas to the reactor 3. Exhaust gas leaves the reactor 3 through line 27. The vaporizer 2 is provided with a line 29 through which hot engine coolant is passed from the engine to the vaporizer 2. Engine coolant passes from the vaporizer 2 through line 30. Line 30 is connected to engine 4. The filter 6 is connected to the endothermic reactor 70 by line 71. Endothermic reactor 70 is connected to adiabatic reactor 3 by line 31. The filter 6 removes solids from the hydrogen rich gaseous mixture passing therethrough. The filter 6 is connected by line 32 to the engine 4. Valve 36 in line 32 is provided to limit the flow of the hydrogen with gaseous fuel to the engine. The valves 24 and 36 completely block the dissociation system including vaporizer to the filter when the system is not in operation. Line 8 is connected to the line 33. Line 33 is connected to the engine 4. Hydrogen rich gas in line 32 mixes with air from line 8 in the line 33. Liquid alcohol passes through line 7 to line 33. The valve 34 in line 7 limits the flow of liquid alcohol therethrough. The liquid alcohol passing through line 7 is atomized prior to being fed to the engine 4.

The preferred alcohol for use as the alcohol fuel in the alcohol tank 1 is methanol.

The fins 9 and 13 extend the length of the reaction chamber wall. Both the inner fins 9 and the outer fins 13 serve to distribute heat along the reaction chamber wall. Inner fins 9 serve to distribute heat into the reactor bed 11 from the reaction chamber wall 10. The outer fins 13 serve to transfer heat from the heat exchange chamber 12 into the reaction chamber wall 10.

The engine is started by methods known in the art for starting internal engines for example by use of an alternate fuel such as liquid methanol delivered through line 7 or a gaseous fuel like propane. After starting the engine, the hot exhaust gases heat the adiabatic reactor 3 by passing through the heat exchange chamber 12. The outer fins 13 conduct heat from those hot exhaust gases and transmit it to the reaction chamber wall 10. The fins 9 transfer heat from the reaction chamber wall 10 into the reaction bed 11. When the initial operating temperature is reached, the mixture of air and methanol vapor are fed to the reactor. Preferably the reactor contains a dual catalyst bed. The initial catalyst contacted by the mixture of air and methanol vapor being a partial oxidation catalyst for example copper/nickel. The subsequent catalyst contacted by the alcohol and partial combustion product mixture being a dissociation catalyst such as copper/zinc catalyst. Partial combustion occurs between the methanol and the air in the initial stage of the adiabatic reactor 3. This partial combustion produces heat. The heat produced in the initial stage of the adiabatic reactor 3 is transferred to the subsequent stage by the inner fins 9.

In a preferred embodiment of the invention, once the catalyst bed is preheated to the initial reaction temperature by the engine exhaust gas, valve 26 is closed and valve 35 is opened by a temperature switch. Valve 72 in line 73 is first opened to send hot exhaust gas to endothermic reactor 70 before closing valve 26. The temperature switch in line 31 also opens valve 24 in line 22 to start the flow of liquid methanol from tank 1 and valve 36 in line 32 to start the flow of hydrogen rich fuel to engine 4. The reaction temperature within the adiabatic reactor 3 is maintained by the rate of partial combustion. The rate of partial combustion is controlled by the amount of air injected through line 15 by control of valve 35. Valve 35 is temperature responsive to the outlet gas temperature in line 71. Valve 35 is connected to line 71 by temperature control signal. The temperature control in line 71 is shown. Alternately valve 26 may be left open or can be an orifice with valve 72 opened allowing a portion of hot exhaust gas to flow through reactor 3 and reactor 70 via line 27 and 73. In this manner, the heat loss from reactor 3 may be minimized and some heat recovery from the exhaust gas may be realized in the reactor.

During cold starts, hot exhaust from the engine passes into the heat exchange chamber of reactor 3 through line 25 and valve 26. The exhaust leaves the heat exchange chamber through line 27. While the reactor is being heated up to the operational temperature, the valves 72 and 18 are closed so that exhaust from line 37 passes into line 25 and into the heat exchange chamber of the adiabatic reactor 3. When the reactor has reached its operating temperature, the valve 26 is closed and valves 18 and 72 are opened so that exhaust no longer passes from line 37 into adiabatic reactor 3 but rather the exhaust from line 37 is channelled into line 39 and 73. The exhaust from endothermic reactor 70 passes to the atmosphere through line 74. The valve 18 controls the exhaust gas flow to the superheater to give the temperature of the methanol vapor from the superheater 5 at the desired inlet temperature for the adiabatic reactor 3. Thus, the adiabatic reactor is isolated from exhaust heat. After the adiabatic reactor 3 has reached its operating temperature the superheater 5 continues to be heated by heat from the exhaust. The vaporizer 2 is optional. Thus, liquid methanol may be fed directly into the superheater 5 from the methanol or alcohol storage tank 1. Alternatively engine exhaust may be passed from the output line 40 of the superheater 5 into the feedline 29 of the vaporizer 2. In which case, engine coolant would not be fed into the feedline 29 of vaporizer 2.

The air being fed through line 15 may be preheated by preheater 41. The preheater 41 may be fed exhaust from line 37 or 74 to provide the preheating heat for air being fed through line 15 into line 20. Beneficially the preheated air does not lower the temperature of the liquid alcohol and/or alcohol vapor being fed to the superheater 5 through line 20.

The reactor 3 preferably is provided with insulation over the heat exchange wall 17 to maintain the temperature therewithin and minimize the transfer of heat therefrom.

During idle, the air/alcohol feed ratio is close to the adiabatic ratio (about 0.16) since the endothermic conversion is negligible in endothermic reactor 70 due to low exhaust temperature. During high speed driving the rate of alcohol feed is increased substantially while the rate of air feed is increased at a slower rate. Thus, the air/alcohol feed ratio becomes substantially less than 0.16. At idle the adiabatic reactor converts most of the feed methanol to hydrogen and carbon monoxide. However at high speed driving at the low air/alcohol ratio the percent conversion in the adiabatic reactor drops to a low level. The use of the endothermic dissociation catalyst in reactor 70 downstream of the adiabatic catalyst in reactor 3 substantially increases the percentage dissociation using waste heat from the exhaust during high speed driving.

FIGS. 1 and 2 show the schematics of reactor 3. The reactor has two divided sections: the inner section holding the catalyst bed and the surrounding empty chamber. The reaction chamber wall 10, separating the catalyst bed 11 and the heat exchange chamber 12, has inside fins 9 and outside fins 13. During cold starts the hot engine exhaust gas flows through the heat exchange chamber to provide the heat required for preheating the bed to a desired temperature. The fins on the reaction chamber wall will enhance the heat transfer and, thus, reduce the preheating time. During normal dissociation operation, the heat exchange chamber is isolated from the exhaust gas flow and, thus, acts as insulation. The feed to reactor 3 is a mixture of superheated methanol and air. For thermally neutral conversion of methanol, the air/methanol ratio in the feed and the reactor inlet temperature are controlled.

The fins inside and outside of the reaction chamber wall are placed parallel to the flow directions of the reactants in the bed and of the exhaust gas in the heat exchange chamber, respectively, in order to minimize the pressure drops in both flows.

The inside fins on the reaction chamber wall have important functions for maintaining catalyst activity and physical integrity. During adiabatic operation the fins will help to maintain a more even temperature distribution in the bed by facilitating longitudinal heat transfer. This heat transfer effect is beneficial to the maintenance of the catalyst activity by reducing the peak temperature generated by the reaction between methanol and oxygen in the front partial combustion zone of the catalyst bed, since a higher temperature deactivates catalyst more by sintering. Further, the inside fins may be beneficial for catalyst pellet integrity by restricting pellet motion resulting from sudden changes in car speed or car vibrations due to rough road conditions.

As shown in FIG. 2, springs 14 and 14' or some other mechanical means of dampening motion may be installed in the heat exchange chamber to absorb any abrupt movements of the automobile without detrimentally affecting catalyst physical integrity.

Because a rapid preheating of the catalyst bed by the heat exchanger is required during cold starts, a reaction chamber wall shape that gives a larger heat transfer area is preferred at the same catalyst volume. For this reason the reaction chamber wall also has many inside fins 9 and outside fins 13. FIGS. 1 and 2 show a configuration of the reactor. FIG. 1 shows that the reaction chamber wall in the reactor has a large width-to-depth ratio in order to have a large peripheral surface area at the same volume.

FIG. 3 shows a schematic flow diagram of the automobile fuel system of the invention. Major components of the fuel system are a vaporizer 2, a superheater 5, a filter 6, and by-pass line 7 in addition to the adiabatic and endothermic reactors.

In the vaporizer 2 the engine coolant, normally at 200°–220° F., provides the heat for the methanol vaporization. In the superheater, the methanol temperature is raised to the desired reactor inlet temperature by heat exchange with the exhaust gas. The vaporizer 2 is optional because the superheater may be used for the methanol vaporization and superheating by directly feeding liquid methanol into it. Air is injected through line 15 to the alcohol feed stream normally before the superheater in order to allow enough time for mixing of the air and alcohol prior to the reactor. The filter 6 collects fines from the catalyst bed.

The by-pass line 7 delivers liquid alcohol directly to the engine as required during cold start or high load driving (acceleration or high speed driving). During cold start, the engine 4 must run on liquid or vaporized alcohol until the dissociation reactor completes its start-up phase. During high load driving the fuel requirement in excess of the maximum throughput of the reactor is provided with liquid alcohol from tank 1 delivered through the by-pass line 7.

The direct feeding of liquid alcohol in excess of the maximum throughput of the reactor may be beneficial for overall car performance without significantly reducing the benefits of the dissociation. The liquid alcohol fed to the engine will boost the engine power by increasing the energy density of the combined fuel when the power is needed at high load conditions. Further, it may lower the $NO_x$ emissions by reducing the combustion temperature in the engine.

The preferred operating mode for the dissociated methanol engine is to operate for maximum efficiency at low-load driving conditions, and for maximum performance at high-load transient driving conditions. Low-load operation consisting of idle and constant speed driving does not require a high power output from the engine. For low-power output, the engine can be operated at a maximum air-fuel ratio or a minimum equivalence ratio to give maximum efficiency. With dissociated methanol the equivalence ratio can be reduced as low as 0.3 without hampering smooth engine operation due to its high hydrogen content. For maximum power output, methanol in excess of the reactor throughput can be by-passed and fed directly into the engine. Air flow is unthrottled. The result is an increase in fuel density up to an equivalence ratio of 1.0, which gives maximum power output.

Operation can be accomplished with a driver controlled accelerator that sends a signal to a microprocessor, which in turn monitors and adjusts engine performance as necessary. Adjustments such as spark advance, air-fuel ratio, etc. are made. The microprocessor maintains the required air-fuel ratio during low-load driving demand by throttling the air flow through valve 79. During high-load transient demands, where acceleration to cruise speed and hill climbing is required, additional fuel as liquid methanol is injected by opening by-pass valve 34. In this mode, air-fuel ratio varies as fuel density is adjusted to give the required engine power output and hence good driving performance.

EXAMPLE

Cold Starts

Since the cold start of the adiabatic reactor requires hot engine exhaust gas for preheating of the adiabatic catalyst bed the engine 4 must be turned on by a method independent of the methanol conversion system. During this period the engine may run on liquid alcohol delivered through the by-pass line.

Once the adiabatic catalyst bed temperature in the reactor has risen to the initial operating temperature, superheated alcohol is fed to the reactor with air injection through line 15. Because of the exothermic heat generated by partial combustion of alcohol, the adiabatic catalyst bed temperature will further rise until endothermic alcohol dissociation becomes effective.

For a 20/10 Cu/Ni catalyst on silica the bed temperature for initiating the partial combustion reaction for methanol is about 300° F. or above. A lower temperature is acceptable if a more active catalyst is used.

During the cold start of the adiabatic reactor, the endothermic reactor is also preheated with the exhaust gas leaving the adiabatic reactor. After the preheating, the gas produced from the adiabatic reactor can be fed to the endothermic reactor without delay. The endothermic catalyst bed temperature will rapidly rise to be effective for the endothermic dissociaton by the sensible heat available from the product gas and the exhaust gas.

The engine can be started independently with a gaseous start-up fuel such as propane, electrically vaporized methanol or finely atomized methanol.

Alcohol Conversion

Once the cold start phase of the adiabatic and endothermic reactors is completed, the adiabatic and endothermic reactors are operated with air injection rate to the adiabatic reactor is controlled to give a maximum waste heat recovery in the endothermic reactor. The $O_2$/methanol feed ratio is normally 0.16, if methanol is completely converted in the adiabatic reactor. The ratio is less than the theoretical number of 0.174 because of the exothermic formation of such by-products as methane and dimethyl ether in very small quantities.

During idle the air/alcohol feed ratio to the adiabatic reactor is near the adiabatic ratio (about 0.16), because of insufficient waste heat available from the exhaust gas for the endothermic dissociation in the endothermic reactor. During high speed driving the rate of alcohol feed is increased substantially while the rate of air feed is increased at a slower rate because the waste heat recovery in the endothermic reactor reduces the air requirement. At idle the methanol conversion to hydrogen and carbon monoxide is almost complete in the adiabatic reactor. However at high speed driving the low air/alcohol ratio reduces this percentage of dissociation in the adiabatic reactor to a low level. The endothermic reactor 70 downstream of the adiabatic reactor 3 converts the remaining unconverted methanol using waste heat from the exhaust.

With a dual adiabatic catalyst bed of Cu/Ni and Cu/Zn catalysts, the following three reactions take place in the adiabatic reactor as major reactions

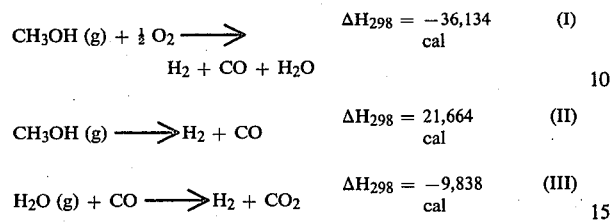

$$CH_3OH\,(g) + \tfrac{1}{2} O_2 \longrightarrow H_2 + CO + H_2O \qquad \Delta H_{298} = -36{,}134 \text{ cal} \qquad (I)$$

$$CH_3OH\,(g) \longrightarrow H_2 + CO \qquad \Delta H_{298} = 21{,}664 \text{ cal} \qquad (II)$$

$$H_2O\,(g) + CO \longrightarrow H_2 + CO_2 \qquad \Delta H_{298} = -9{,}838 \text{ cal} \qquad (III)$$

Methanol is first converted via Reactions (I) and (II) in the Cu/Ni catalyst zone and the remaining methanol is converted via Reactions (II) and (III) in the following Cu/Zn catalyst zone. Because Reaction (I) is very fast on a Cu/Ni catalyst, oxygen is rapidly consumed to completion in the zone. The rapid progress of Reaction (I) creates a temperature peak in the zone. After the depletion of oxygen the endothermic reaction (Reaction (II)) becomes dominant and, thus, cools down the bed temperature. The gas leaving the adiabatic reactor is very close to equilibrium for the water/gas shift reaction because of the excellent shift activity of the Cu/Zn catalyst.

Having thus described the invention by reference to certain of its preferred embodiments it is respectfully pointed out that embodiments described are illustrative rather than limiting in nature and that many variations and modifications are possible within the scope of the present invention. Such variations and modifications may appear obvious and desirable to those skilled in the art upon a review of the foregoing description of preferred embodiments.

What is claimed is:

1. A method of fuel treatment and distribution for an automobile internal combustion engine comprising the steps as follows:
    (a) operating an adiabatic reactor without a substantial amount of exhaust heat within an operational temperature range said catalyst bed reactor comprising a partial combustion catalyst and a dissociation catalyst;
    (b) providing a substantial amount of engine exhaust heat to an endothermic reactor having an endothermic dissociation catalyst therein,
    (c) vaporizing liquid alcohol to form alcohol vapor;
    (d) mixing said alcohol vapor with air to form a partial combustion mixture;
    (e) contacting said partial combustion mixture and said partial combustion catalyst whereby a dissociation mixture is formed and heat is evolved;
    (f) contacting said dissociation mixture and said dissociation catalyst to form a hydrogen-rich fuel;
    (g) contacting said hydrogen-rich fuel and said endothermic dissociation catalyst to form a fuel product whereby at least a portion of any residual undissociated alcohol in said hydrogen-rich fuel is dissociated to hydrogen and carbon monoxide using the engine waste heat provided by the exhaust gas.
2. The method of claim 1 wherein said partial combustion catalyst is Cu/Ni and said dissociation catalyst and said endothermic dissociation catalyst are Cu/Zn.
3. The method of claim 1 further comprising
    mixing said fuel product and air to form a total combustion mixture; and
    burning said total combustion mixture in an internal combustion engine.

* * * * *